(12) United States Patent
Batra et al.

(10) Patent No.: US 6,988,044 B2
(45) Date of Patent: *Jan. 17, 2006

(54) BUS LINE CURRENT CALIBRATION

(75) Inventors: Pradeep Batra, Santa Clara, CA (US); Rick A. Rutkowski, Sunnyvale, CA (US)

(73) Assignee: Rambus Inc., Los Altos, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/409,033

(22) Filed: Apr. 8, 2003

(65) Prior Publication Data

US 2004/0034485 A1 Feb. 19, 2004

Related U.S. Application Data

(63) Continuation of application No. 09/711,606, filed on Nov. 13, 2000, now Pat. No. 6,546,343.

(51) Int. Cl.
*G06R 19/00* (2006.01)

(52) U.S. Cl. .............................. 702/64; 702/57; 702/64; 702/74; 702/86; 702/107; 327/108; 327/68; 327/74; 324/522; 324/527; 337/83; 710/107

(58) Field of Classification Search ................. 702/57, 702/64, 66, 74, 82, 86, 107, 193; 327/68, 327/74, 87; 324/522, 5, 527; 337/83, 609; 710/107
See application file for complete search history.

(56) References Cited

U.S. PATENT DOCUMENTS 4,173,039 A * 10/1979 Sun et al. ..................... 363/84
5,973,516 A * 10/1999 Bremner et al. ............... 327/74
6,094,075 A    7/2000 Garrett et al.
6,160,851 A   12/2000 Brown et al.
6,294,934 B1   9/2001 Garrett et al.
6,301,358 B1 * 10/2001 Chen et al. .................. 379/413
6,313,670 B1  11/2001 Song et al.
6,313,776 B1  11/2001 Brown
6,330,194 B1  12/2001 Thomann et al.
6,333,639 B1  12/2001 Lee
2002/0050844 A1  5/2002 Lau et al.
2002/0087280 A1  7/2002 To et al.

OTHER PUBLICATIONS

Shen et al., 'On–Chip Current Sensing Circuit for CMOS VLSI', Jun. 1992, IEEE, pp. 309–314.*
Schrift, 'Digital BUS Faults Measuring Techniques', Jan. 1998, IEEE, pp. 382–387.*
Maxwell et al., 'A Simulation–Based Method for Estimating Defect Free IDDQ', Jan. 1997, IEEE, pp. 80–84.*

* cited by examiner

*Primary Examiner*—Patrick Assouad
*Assistant Examiner*—Elias Desta
(74) *Attorney, Agent, or Firm*—Lee & Hayes, PLLC

(57) ABSTRACT

Disclosed herein is a method and system for calibrating line drive currents in systems that generate data signals by varying line drive currents and that interpret the data signals by comparing them to one or more reference voltages. The calibration includes varying the line drive current at a transmitting component. At different line drive currents, a receiver reference voltage is varied while the transmitting component transmits data to a receiving component. At each line drive current, the system records the highest and lowest receiver reference voltages at which data errors do not occur. The system then examines the recorded high and low receiver reference voltages to determine a desirable line drive current.

31 Claims, 5 Drawing Sheets

BUS LINE CURRENT CALIBRATION

RELATED PATENT APPLICATION(S)

This U.S. Nonprovisional Application for Letters Patent claims priority from, and is a Continuation Application of, U.S. Nonprovisional Application for Letters Patent Ser. No. 09/711,606, filed on Nov. 13, 2000 U.S. Pat. No. 6,546,343, and entitled "Bus Line Current Calibration".

TECHNICAL FIELD

This invention relates to bus systems in which line voltages are generated by varying line currents and are interpreted with reference to a reference voltage.

BACKGROUND OF THE INVENTION

FIG. 1 is a block diagram showing a high-speed digital computer bus system 20. The bus system includes a number of discrete devices 22–24, which communicate over an electrical bus 25 at very high speeds. The bus includes a plurality of data transmission lines.

This system includes a master device 22 and a plurality of slave devices 23–24. The master device 22 initiates and controls data exchanges over bus 25. During a data exchange, any one of devices 22–24 can act as either a transmitting component or a receiving component. Generally, there is only one transmitting component during any single data exchange. However, there can be one or a plurality of receiving components during a data exchange.

FIG. 2 illustrates the configuration and operation of a single bus line 26 between a transmitting component 27 and a receiving component 28. The bus line is terminated at one end to a termination voltage $V_{term}$ through a termination impedance $R_{term}$. Transmitting component 27 has a line current driver 29, which produces line voltages with specified relationships to a reference voltage VREF.

More specifically, driver 29 is a current source or sink that creates desired voltage drops across termination impedance $R_{term}$. The current driver 29 is turned on or otherwise enabled to produce one logic level voltage, and is turned off or otherwise disabled to produce another logic level voltage. In actual embodiment, the current driver 29 sinks current when enabled, and does not sink or source current when disabled. When disabled, the line voltage is approximately equal to $V_{term}$. When enabled, the line voltage is lower than $V_{term}$, because of a voltage drop through termination impedance $R_{term}$.

As an example, suppose that $V_{term}$ is 2.5 volts. When driver 29 is disabled there is no current through the bus line, and the bus line voltage is equal to $V_{term}$, or 2.5 volts. This is the high logic level, and is referred to as $V_{OH}$. On the other hand, when transistor 33 is enabled the current through the bus line drops the line voltage to a lower value $V_{OL}$, which in this example is 1.9 volts. $V_{OL}$ is the low logic level.

The voltage difference between $V_{OH}$ and $V_{OL}$, also referred to as a line voltage swing $V_{swing}$, is controlled by the value of termination resistance $V_{term}$, and the amount of line current $I_O$ (which is controlled by the current driver 29). It is desirable to limit the line voltage swing as much as possible to enable higher bus speeds. If the voltage swing is too small, however, a receiving component will not be able to reliably distinguish between high and low logic level voltages.

FIG. 2 also illustrates how the line voltage is interpreted at receiving component or device 28. Specifically, the received line voltage $V_O$ is compared to reference voltage VREF by a comparator 40. If $V_D$ is greater than VREF, the line voltage represents a high logic level. If $V_O$ is less than VREF, the line voltage represents a low logic level.

For this determination to be valid, the transmitting component needs to set its $V_{OH}$ and $V_{OL}$ relative to VREF. Preferably, $V_{OH}$ and $V_{OL}$ are established symmetrically around VREF. In the example of FIG. 3, $V_{OH}$ is 2.5 volts, $V_{REF}$ is 2.2 volts, and $V_{OL}$ is 1.9 volts. This yields a 0.6 volt voltage swing: 0.3 volts on either side of VREF.

FIG. 3 shows a circuit for creating a symmetrical voltage swing around VREF during a calibration process. This circuit, which is used only during the calibration, utilizes two different bus lines 60 and 61, each of which are similar to the bus line 26 shown in FIG. 2.

The calibration circuit has current drivers 62 and 63, and a current control 64 which in this case is an up/down counter. Current drivers 62 and 63 are switched on and off by data control lines (not shown) to create high and low voltage levels $V_{OH}$ and $V_{OL}$ on the corresponding bus lines. When a driver is on, the magnitude of its output current is determined by the value contained in up/down counter 64.

Bus lines 60 and 61 extend to receiving components and a termination resistor (not shown). Within the transmitting component, however, the high and low output voltages $V_{OH}$ and $V_{OL}$ are sampled for purposes of adjusting the current driver outputs to create a symmetric voltage swing. Specifically, a simple R over R resistive voltage divider 66 is placed between a line producing a high logic voltage $V_{OH}$ and another line producing a low logic level $V_{OL}$. In this case, it is assumed that line 60 is at the high voltage level, with current driver 62 inactive; and bus line 61 is at the low voltage level, with current driver 63 being active. Furthermore, the resistive divider 66 is configured to produce an intermediate output voltage $V_I$ that is equal to $(V_{OH}+V_{OL})/2$. For symmetry around VREF, $V_I$ should be equal to VREF. A feedback system is used to minimize the voltage difference between $V_I$ and VREF. Both $V_I$ and VREF are connected to the inputs of a comparator 68, which produces a logic voltage $V_F$ that is high when $V_I$-VREF>0, and low when $V_I$-VREF<0. $V_F$ is then connected to counter 64. The output of the counter, in turn, is connected to control the output of current drivers 62 and 63.

The circuit works as follows. During calibration, counter 64 is enabled and/or clocked, and repetitively adjusts its output either up or down depending on the logic value of $V_F$. This increases or decreases the output of current driver 63. The output current is thus adjusted until the value of counter 64 has settled. At this point, $V_I$-VREF=zero-meaning that $V_I$=VREF and that $V_{OH}$ and $V_{OL}$ are symmetric around VREF. At this point, the value of counter 64 is frozen until the next calibration (although minor adjustments might be made by temperature control circuits).

In most cases, this calibration is performed at system initialization. Optionally, the calibrated current control value (from the counter) can be stored in a current control register and used during normal bus operation to control the magnitude of $I_O$. This value can then be subject to temperature correction circuits to determine the current control value at any given time. Alternatively, the calibration can be performed periodically to account for temperature and voltage variations.

Ideally, both the transmitting component and a receiving component have the same value of VREF. In practice, however, this can be difficult to achieve due to signal line losses and/or noise. Accordingly, VREF at the receiving component is often somewhat different than VREF at the transmitting component. Furthermore, $V_{OH}$ and $V_{OL}$ often change as they propagate through the signal line, again due to losses and noise. Thus, the relationship between $V_{OH}$, $V_{OL}$ and VREF may not be the same at the transmitting component as it is at the receiving component. In other words, $V_{swing}$ might not be symmetric around VREF by the time the signals reach a receiving component.

In the bus configuration described above, line losses generally affect $V_{OL}$ more than $V_{OH}$. At $V_{OL}$, the voltage is being produced by a current through the bus line, so the voltage can be affected along the length of the bus line by resistive and capacitive loads. At $V_{OH}$, however, there is no line current, and therefore less opportunity for the voltage to be affected along the length of the bus line. This situation affects both the line voltage swing and the relationship of $V_{OL}$ with VREF.

The non-symmetry at the receiving component has negative effects. If $V_{OL}$ is higher at the receiving component, the voltage margin from VREF to $V_{OL}$ is decreased. When $V_{OL}$ is lower at the receiving component, low-side margin is increased, but the higher $V_{swing}$ would cause more reflections, which could degrade the high-side margin during a subsequent data transfer cycle This issue has been addressed by introducing a degree of asymmetry at the transmitting component in order to provide symmetry at the receiving component: the current drivers at the transmitting component are adjusted to achieve voltage symmetry at the receiving component. The amount of asymmetry at the transmitting component is referred to as the overdrive factor (ODF).

A desired asymmetry at the transmitting component can be created by varying the ratio of voltage divider 66. Thus, instead of producing a signal $V_I$ that is 50% of the way from $V_{OL}$ to $V_{OH}$, the resistors can be chosen to implement any other percentage. This creates asymmetry at the transmitting component to correct for any asymmetry that would otherwise be present at the receiving component.

In actual embodiment, the ratio of voltage divider 66 has been controlled by a symmetry control register. Different values can be loaded into the symmetry control register to create different degrees of asymmetry at the transmitting component. Symmetry control values can be stored for a plurality of different receivers, and used when transmitting to those receivers. This accounts for variations in conditions at different receivers.

In some such circuits, the value of counter 64 is stored after completion of the calibration process, and loaded into a current control register during actual operation. A plurality of values can be stored, corresponding to different receiving components. The current control register is reloaded for communication with different receiving components.

The desired line current and corresponding divider percentage or ratio are determined during system design—prior to manufacture of the transmitting component or prior to manufacture of a circuit that utilizes the transmitting component. The determination is based on testing and/or simulating, and choosing voltage divider ratios that are predicted to work with the different receivers in light of the actual circuit layout. In some cases, the transmitting component includes logic for predicting required asymmetry values based on known system parameters such as distances between components.

The inventors, however, have discovered and developed a way to dynamically determine appropriate line drive currents at system initialization, based on tested characteristics of the circuits themselves.

DETAILED DESCRIPTION

The following description sets forth specific embodiments of a bus driver calibration method and circuits having elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Figure 1:
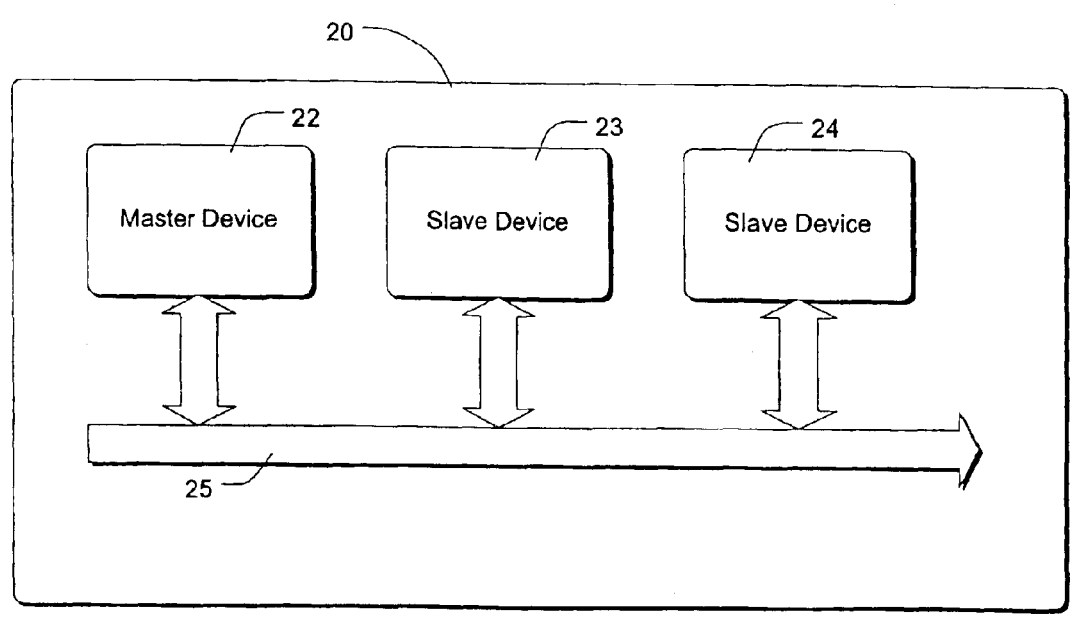
FIG. 1 is a block diagram of a high-speed digital computer bus system in accordance with the prior art.
Figure 2:
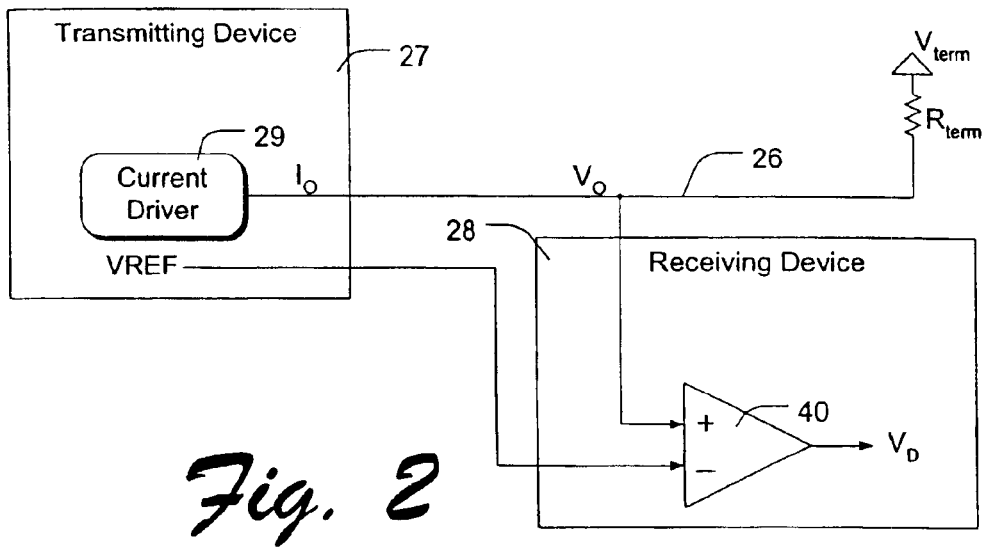
FIG. 2 is a block diagram illustrating a bus line transmitter and receiver in accordance with the prior art.
Figure 3:
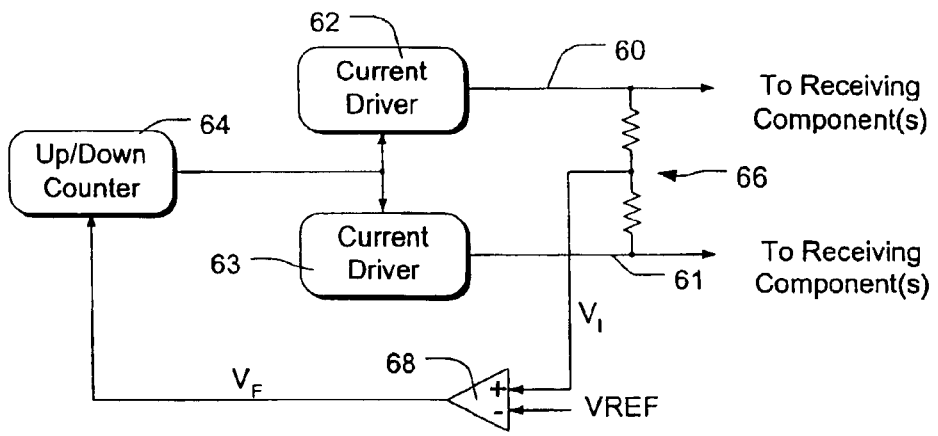
FIG. 3 is a block diagram illustrating a prior art method of controlling bus line current.
Figure 4:
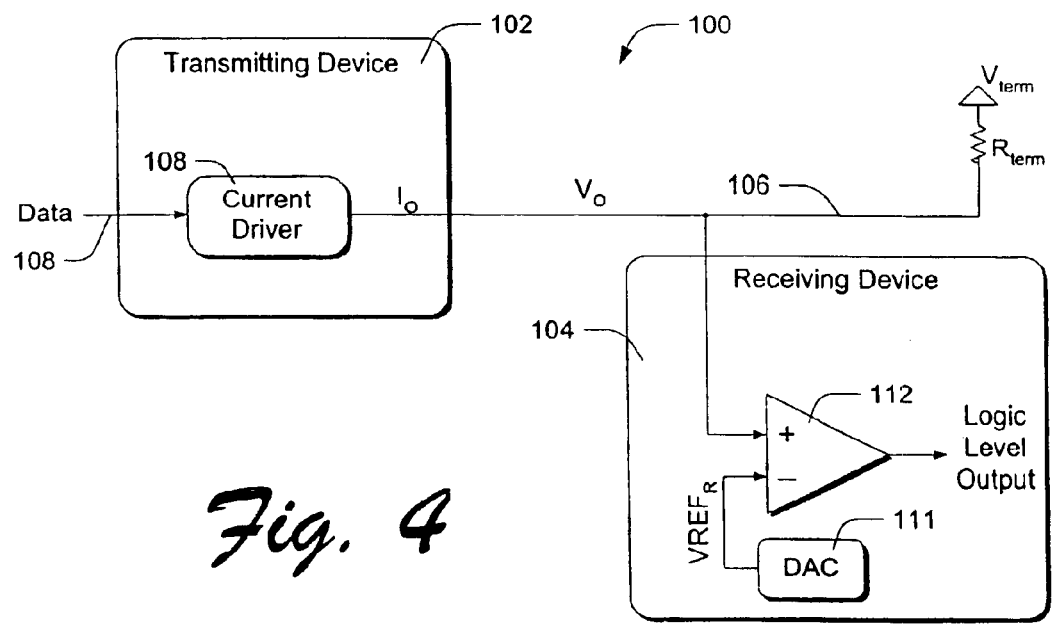
FIG. 4 is a block diagram of a first embodiment illustrating a bus line calibration method.

FIG. 4 shows pertinent parts of a data communications system 100 that can be used to implement a method of calibrating or finding a desirable line drive current. The system allows such calibration during device operation. The calibration is usually performed at system startup or initialization. Through actual testing during the calibration procedure, asymmetry values are determined for different transmitting components. Furthermore, each transmitting component can find a different asymmetry value for every possible receiving component. This allows an optimal line current to be used for each different receiver.

The overall system is of a type that interprets data signals by comparing them to reference voltages. Signals are transmitted over a plurality of data signaling lines, also referred to as bus lines. Each bus line is terminated to a termination voltage $V_{term}$, through a termination resistance $R_{term}$. The data signals comprise line voltages that are produced by line drive currents through $R_{term}$. The line voltages are compared to the reference voltages to determine whether the voltages represent high or low logic values.

This type of bus system is used in various environments. One of its most common uses is for high-speed data communications busses between microprocessors and peripheral devices such as high-speed memory devices. Such bus systems are also used in high-speed memory subsystems, between memory devices and memory device controllers.

For purposes of discussion, the illustration of FIG. 4 has been greatly simplified, and shows only parts of the transmitting and receiving components that might be used in a calibration process.

FIG. 4 shows a single transmitting component 102 and a single receiving component 104. A data bus line 106 extends between transmitting component 102 and receiving component 104. In practice, there are a plurality of bus lines, and each bus line might be connected to one or more transmitting components and/or one or more receiving components.

Within transmitting component 102, a current driver 108 generates a current $I_O$ though bus line 106. The current driver is responsive to a logic level data signal 110 to switch the current driver on or off, generating a signal voltage $V_O$. A high signal voltage is referred to as $V_{OH}$, and is the result of switching the driver off. A low signal voltage is referred to as $V_{OL}$, and is the result of switching the driver on. $V_{OH}$ and $V_{OL}$ are usually used to represent high and low binary logic levels "1" and "0".

Receiving component 104 has a reference voltage $VREF_R$ that can be independent of any voltage in transmitting component 102. $VREF_R$ is generated by a digital-to-analog converter (DAC) 111. The DAC can be integrated with receiving component 104 or it can be separate from receiving component 104.

Receiver 104 includes a voltage comparator 112 that compares two analog voltage inputs and produces a binary voltage signal indicating which of the two input voltages is greater in magnitude. A comparator such as this is associated with each bus line to evaluate whether a logic signal represents a high or low logic voltage level.

One input of comparator 112 receives receiver reference voltage $VREF_R$. The other input of comparator 112 is connected to bus line 106. In response to these two inputs, the comparator generates a logic level signal or voltage $V_D$, representing a data bit or other information that has been transmitted from transmitting component 102. The value of $V_D$ is dependent on whether $V_O$ is greater or less than $VREF_R$.

Figure 5:
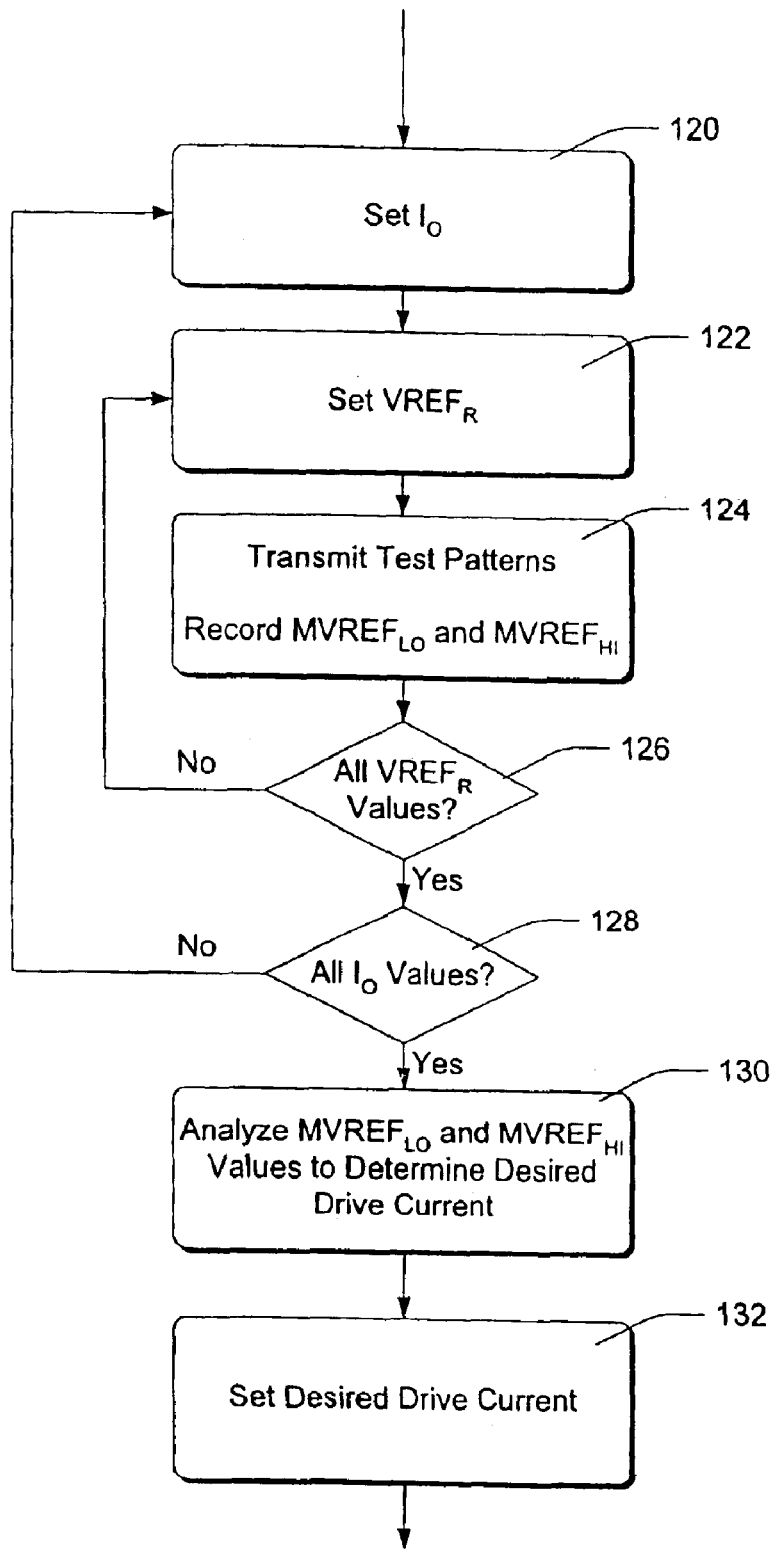
FIG. 5 is a flowchart showing methodological operations performed in a bus line calibration method.

FIG. 5 illustrates a method of calibrating current driver 108 so that the resulting voltage swing $V_{swing}$ is symmetrical around $VREF_R$. Such a calibration is performed during system startup or during initialization of the transmitting and/or receiving components.

The method comprises varying the line drive current $I_O$—sequentially setting $I_O$ to each of a range of possible values $I_O$. This is accomplished by sequentially configuring the transmitting component's current driver 108 to supply line drive current $I_O$ at a plurality of discrete values $I_O[0]$ through $I_O[n]$, as indicated in FIG. 5 by blocks 120 and 128.

Blocks 122 and 126 indicate an operation of varying the receiver reference voltage $VREF_R$ through a predetermined sequence of different available voltages. This operation is repeated for every value of $I_O$.

Operation 124 is performed for each $VREF_R$ value, and comprises transmitting data from transmitting component 102 to receiving component 104 to find high and low receiver reference voltages at which data errors do not occur.

More specifically, operations 122, 124, and 126 comprise setting $VREF_R$ to some intermediate value and then varying $VREF_R$ downward. At each value of $VREF_R$, the transmitting component sends worst-case test data and then determines whether or not there was an error in receiving the data at the receiving component. Initially, at intermediate voltages, errors are unlikely. However, as $VREF_R$ is varied further downward, the margin between $VREF_R$ and $V_{OL}$ will become small enough to cause data errors. This establishes the low receiver reference voltage $MVREF_{LO}$—the lowest $VREF_R$ at which data errors do not occur. A similar procedure, varying $VREF_R$ in the upward direction, establishes $MVREF_{HI}$—the highest $VREF_R$ at which data errors do not occur.

$MVREF_{LO}$ and $MVREF_{HI}$ are noted or recorded in arrays $MVREF_{LO}[i]$ and $MVREF_{HI}[i]$, corresponding to each drive current value $I_O[i]$.

An operation 130 comprises examining or evaluating the noted high and low receiver reference voltages $MVREF_{LO}[i]$ and $MVREF_{HI}[i]$ corresponding to different drive currents $I_O[i]$, to determine a desirable line drive current. More specifically, this operation comprises finding a pair of receiver reference voltages $MVREF_{LO}[i]$ and $MVREF_{HI}[i]$, for each value of i through n, that meet pre-specified criteria or are within specified parameters. Such predefined criteria, for example, might require that $MVREF_{LO}[i]$ is less than some specified value and that $MVREF_{HI}[i]$ is above some other specified value. Alternatively, the predefined criteria might specify that the desired drive current $I_O[i]$ is obtained when $V_{swing}$, the difference between $MVREF_{HI}[i]$ and $MVREF_{LO}[i]$, is at its greatest. This relationship produces the highest useful voltage margin at $V_{OL}$. Another criteria might specify the drive current $I_O[i]$ corresponding to the pair of $MVREF_{LO}[i]$ and $MVREF_{HI}[i]$ whose average $(MVREF_{LO}[i]-MVREF_{HI}[i])/2)$ is closest to the $VREF_R$ value that will be used during normal bus operation. This ensures that $V_{OL}$ and $V_{OH}$ are symmetrical around $VREF_R$ during normal bus operation.

Operation 132 comprises setting current driver 108 to the drive current $I_O[i]$ corresponding to the pair of receiver reference voltages $MVREF_{LO}[i]$ and $MVREF_{HI}[i]$ that were found in operation 130. This drive current $I_O[i]$ is used on all of the data signaling lines originating from transmitting component 102.

Figure 6:
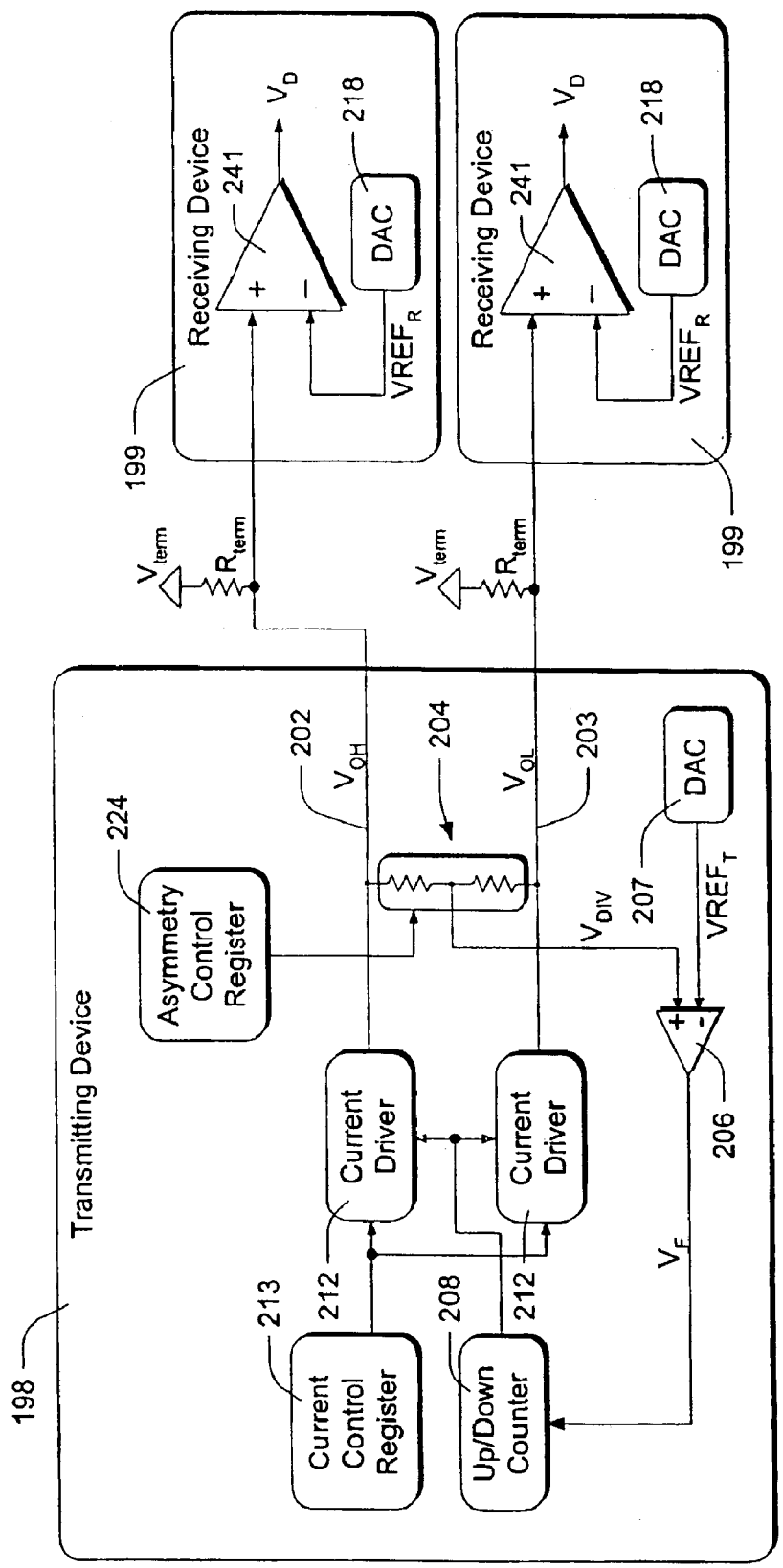
FIG. 6 is a block diagram of a second embodiment illustrating a bus line calibration method.

FIG. 6 shows a different embodiment of a system in which $V_{OL}$ and $V_{OH}$ are calibrated to provide symmetry at a receiving component. FIG. 6 shows only the current control and calibration circuitry in a transmitting component 198 and the comparison circuitry of a receiving component 199.

The current control and calibration circuitry of transmitting component 198 uses two different bus lines 202 and 203. A variable voltage divider 204 is located between the two bus lines. Divider 204 divides the voltage differential between a high line voltage $V_{OH}$ and low line voltage $V_{OL}$ to obtain an intermediate voltage $V_{DIV}$ that is a dynamically programmable fraction between the high and low line voltages $V_{OH}$ and $V_{OL}$. The output voltage $V_{DIV}$ of variable voltage divider 204 is controlled by a factor x stored in a symmetry control register 224: $V_{DIV}=V_{OL}+x (V_{OH}-V_{OL})$, where factor x is a value between 0 and 1.

The output $V_{DIV}$ of the voltage divider is provided to a comparator 206, along with a transmitter reference voltage $VREF_T$. $VREF_T$ is generated by a DAC 207. The output feedback voltage $V_F$ of the comparator is connected to control a current controller. Specifically, $V_F$ drives the up/down count of a current control counter 208. The value of counter 208 is received by current drivers 212 (one associated with each bus line 202 and 203) to set or control the output line current $I_O$, and, consequently, the line voltage $V_{OL}$.

Up/down counter 208 is configured to control current drivers 212 only during a calibration operation. In normal bus operation, the current drivers' output $I_O$ is controlled directly, by a current control register 213.

During normal bus operation, the current drivers are independently enabled and disabled in accordance with data signals (not shown) that indicate the data values that are to be transmitted. When enabled, a bus driver produces a line current $I_O$ according to the value held in counter 208 or current control register 213, and a corresponding low line voltage $V_{OL}$. When disabled, a bus driver produces no current and a corresponding high line voltage $V_{OH}$, regardless of the value of counter 208 or current control register 213.

During normal bus operation, current control register 213 remains at a fixed value except for changes to account for temperature and power supply variations. Voltage divider 204, comparator 206, and symmetry control register 224 are not used during normal operation.

A calibration procedure is performed to determine appropriate values for current control register 224. During calibration, current drivers 212 are controlled by the output of up/down counter 208, rather than by current control register 213. The calibration process is performed at system startup or initialization, between a transmitter and every one of its possible receivers. During this process, bus line 202 is set to its high voltage $V_{OH}$ by disabling the associated current driver 212. Bus line 203 is set to its low voltage $V_{OL}$ by enabling the associated current driver 212.

The calibration circuit of FIG. 6 regulates drive current $I_O$ to maintain $V_{DIV}$ approximately equal to $V_{REF}$. Thus, $V_{DIV}=V_{REF}$ and $V_{REF}=V_{OL}+x\,(V_{OH}-V_{OL})$. If x=0.5, then, $V_{REF}$ is halfway or 50% of the way between $V_{OL}$ and $V_{OH}$. If x=0.25, $V_{REF}$ is 25% of the way from $V_{OL}$ to $V_{OH}$. Thus, factor x represents the location of $V_{REF}$ as a fraction or percentage of the voltage range between $V_{OL}$ and $V_{OH}$.

In each receiving component 199, one of the bus lines 202/203 is connected to one input of a comparator 241. The other input of the comparator receives $VREF_R$. $VREF_T$ and $VREF_R$ are controlled independently for the transmitting component and the receiving component. Thus, while one DAC 207 generates $VREF_T$ for transmitter 198, a different programmable DAC 218 generates $VREF_R$ for receiver 199. In FIG. 6, a separate DAC 218 is shown for every receiving component 199. However, some embodiments might use a single DAC to supply a common $VREF_R$ to every receiving component.

The method of FIG. 5 is used in conjunction with the circuit of FIG. 6 to calibrate $I_O$. In order to vary $I_O$ during step 120, the factor x in symmetry control register 224 is cycled through its available values. Step 130 comprises determining the value of symmetry control register 224 that was used to produce the desired values of $MVREF_{LO}$ and $MVREF_{HI}$, and reloading this value into the symmetry control register 224 for future voltage/temperature calibrations. Step 132 comprises copying the counter value to the current control register 213 for subsequent use in normal operation of the bus lines.

During normal operation, voltage/temperature calibrations can be performed by continuously varying the value of current control register 213. In the described embodiment, however, a voltage/temperature calibration operation is performed every 10 milliseconds using the calibration circuitry already described. This operation involves activating voltage divider 204 and up/down counter 208 to control current drivers 212. Using the symmetry value found in step 130, the up/down counter is allowed to settle to a new value that maintains the originally determined degree of asymmetry with regard to $VREF_T$. This new value is then loaded into current control register 213 for subsequent normal operation of the bus lines.

The circuits and methods described above allow transmitter drive currents to be optimized for each of a plurality of receivers. Furthermore, the calibration is performed dynamically, for actual pairs of transmitters and receivers. This method is more likely to produce optimum drive currents than the prior art method of predicting asymmetry values based on assumptions made during system design.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A system having one or more data signaling lines between a transmitting component and a receiving component, the system comprising;
   current varying means for varying a line drive current, the current varying means located at the transmitting component;
   voltage varying means for varying a receiver reference voltage, while the transmitting component transmits data to the receiving component, to find high and low receiver reference voltages at which data errors do not occur at different respective line drive currents;
   notation means for noting the high and low receiver reference voltages corresponding to the different respective line drive currents; and
   examination means for examining the noted high and low receiver reference voltages to find a desirable line drive current.

2. A system as recited in claim 1 wherein the examination means comprises:
   determination means for determining a line drive current at which the noted high and low receiver reference voltages are within specified parameters.

3. A system as recited in claim 1 wherein the examination means comprises:
   determination means for determining a line drive current at which the noted high and low receiver reference voltages have a specified relationship with each other.

4. A system as recited in claim 1 wherein the examination means comprises:
   determination means for determining a line drive current at which the noted high receiver reference voltage is greater than a first parameter and the noted low receiver reference voltage is less than a second parameter.

5. A system as recited in claim 1 wherein the examination means comprises;
   determination means for determining a line drive current at which a difference between the noted high and low receiver reference voltages is greatest.

6. A system as recited in claim 1 wherein the examination means comprises:
   determination means for determining a line drive current at which an average of the noted high and low receiver reference voltages is approximately equal to a receiver reference voltage used during normal bus line operation.

7. A system as recited in claim 1 further comprising:
   means for using the desirable line current on the one or more data signaling lines.

8. A system as recited in claim 1, further comprising:
   means for finding and storing desirable line drive currents for a plurality of different receiving components.

9. A system as recited in claim 1, further comprising:
   means for finding and storing desirable line drive currents for a plurality of different receiving components; and
   means for using the stored desirable line drive currents with the plurality of different receiving components.

10. A system as recited in claim 1 wherein the current varying means comprises:
    voltage division means for dividing a voltage differential between a high line voltage and a low line voltage to obtain an intermediate voltage that is a dynamically programmable fraction between the high and low line voltages;

regulation means for regulating the line drive current produced by the current varying means to maintain the intermediate voltage approximately equal to a transmitter reference voltage; and fraction varying means for varying the programmable fraction to vary the regulated line drive current.

11. A data communications system of a type that interprets data signals by comparing them to one or more reference voltages, the data communications system comprising:

a transmitting component and a receiving component;

transmission means for transmitting data between the transmitting component and the receiving component;

current driver means for driving a current on the transmission means, wherein the current driver means regulates the current driven on the transmission means to produce high and low voltages on the transmission means;

voltage divider means for dividing a voltage to produce an intermediate voltage that is a variable fraction between the high and low voltages;

wherein the current driver means establishes the regulated current driven on the transmission means so that the intermediate voltage is approximately equal to a reference voltage of the transmitting component;

fraction varying means for varying the variable fraction of the voltage divider means to vary the regulated current driven on the transmission means;

voltage varying means for varying a receiver reference voltage, while the transmitting component transmits data to the receiving component, to find high and low receiver reference voltages at which data errors do not occur at different respective variable fractions;

notation means for noting the high and low receiver reference voltages corresponding to the different respective variable fractions; and comparison means for comparing the noted high and low receiver reference voltages of each driven current to find a variable fraction that produces a desirable driven current.

12. A data communications system as recited in claim 11 wherein the comparison means comprises at least one of:

determination means for determining a variable fraction at which the noted high and low receiver reference voltages are within specified parameters;

determination means for determining a variable fraction at which the noted high and low receiver reference voltages have a specified relationship with each other;

determination means for determining a variable fraction at which the noted high receiver reference voltage is greater than a first parameter and the noted low receiver reference voltage is less than a second parameter;

determination means for determining a variable fraction at which a difference between the noted high and low receiver reference voltages is greatest; or determination means for determining a variable fraction at which an average of the noted high and low receiver reference voltages is approximately equal to a receiver reference voltage used during normal, non-calibration operation of the data communications system.

13. A data communications system as recited in claim 11, further comprising:

means for using the desirable driven current on the transmission means.

14. A data communications system as recited in claim 11, further comprising:

a plurality of different receiving components; and means for finding and storing a respective desirable driven current for each respective receiving component of the plurality of different receiving components.

15. A data communications system as recited in claim 11, comprising:

means for finding and storing desirable driven currents for a plurality of different receiving components; and means for using the stored desirable driven currents with the plurality of different receiving components.

16. A method comprising:

setting a line current at a transmitting device;

setting a reference voltage at a receiving device;

transmitting at least one test pattern from the transmitting device to the receiving device;

determining if there is an error in receiving the at least one test pattern at the receiving device;

varying the reference voltage across multiple voltage levels and repeating the setting a reference voltage, the transmitting, and the determining for each voltage level of the multiple voltage levels;

recording a high reference voltage and a low reference voltage from among the multiple voltage levels at which there is no determined error in receiving the at least one test pattern;

varying the line current across a range of line current values and repeating the setting a line current, the setting a reference voltage, the transmitting, the determining, the varying the reference voltage, and the recording for each line current value of the range of line current values; and analyzing the recorded high and low reference voltages for each line current value of the range of line current values to find a desirable line current.

17. A method as recited in claim 16 wherein the analyzing comprises at least one of:

determining a line current at which the recorded high and low reference voltages are within specified parameters;

determining a line current at which the recorded high and low reference voltages have a specified relationship with each other;

determining a line current at which the recorded high reference voltage is greater than a first parameter and the recorded low reference voltage is less than a second parameter;

determining a line current at which a difference between the recorded high and low reference voltages is greatest; or determining a line current at which an average of the recorded high and low reference voltages is approximately equal to a reference voltage used during normal operation of the transmitting and receiving devices.

18. A method as recited in claim 16, further comprising:

using the desirable line current on one or more data signaling lines coupling the transmitting device to the receiving device.

19. A method as recited in claim 16, further comprising:

finding and storing desirable line currents for a plurality of different receiving devices.

20. A method as recited in claim 16, further comprising:

finding and storing respective desirable line currents for respective receiving devices of a plurality of different receiving devices; and using the stored respective desirable line currents with the respective receiving devices of the plurality of different receiving devices.

21. A method as recited in claim 16, wherein the determining comprises:

comparing one or more voltage levels of the at least one test pattern to the reference voltage.

22. A method as recited in claim 16 wherein the recording comprises:

recording the high reference voltage and the low reference voltage in at least one array so as to correspond to a current line current value.

23. A method as recited in claim 16 wherein the varying the line current across a range of line current values comprises:

changing a voltage division factor of a voltage divider.

24. A system comprising:

one or more data signaling lines;

a transmitting component that is coupled to the one or more data signaling lines and varies a drive current applied thereto across a range of drive current values, wherein the transmitting component transmits test data;

a receiving component that is coupled to the one or more data signaling lines and receives the test data, wherein the receiving component varies a reference voltage and records a high reference voltage and a low reference voltage at which the test data is received without error for each drive current value of the range of drive current values; and wherein the system analyzes the recorded high and low reference voltages of each drive current value to determine a desirable drive current.

25. A system as recited in claim 24 wherein the system analyzes the recorded high and low reference voltages of each drive current value to find a pair of reference voltages that meet pre-specified criteria and/or are within specified parameters to determine the desirable drive current.

26. A system as recited in claim 24 wherein the transmitting component includes a current driver that is capable of driving currents at different drive current values across the range of drive current values.

27. A system as recited in claim 24 wherein the receiving component includes a reference voltage generator that generates the varied reference voltage.

28. A system as recited in claim 27 wherein the receiving component further includes a voltage comparator that compares a particular reference voltage level of the varied reference voltage to the test data to detect a receiving error.

29. A system as recited in claim 24 wherein the system sets the drive current applied to the one or more data signaling lines to be the desirable drive current during normal operation.

30. A system as recited in claim 24 wherein the transmitting component includes:

at least one current driver that regulates drive current through the one or more data signaling lines to produce high and low line voltages on the one or more data signaling lines; and a voltage divider that produces an intermediate voltage that is a variable fraction between the high and low line voltages;

wherein the at least one current driver establishes the regulated drive current so that the intermediate voltage of the voltage divider is approximately equal to a reference voltage of the transmitting component.

31. A system as recited in claim 24 wherein the receiving component includes at least one array that notes each respective recorded high reference voltage and each respective recorded low reference voltage as corresponding to each respective drive current value of the range of drive current values.

* * * * *